(12) United States Patent
Anderson et al.

(10) Patent No.: US 11,442,685 B2
(45) Date of Patent: Sep. 13, 2022

(54) REMOTE INTERACTION VIA BI-DIRECTIONAL MIXED-REALITY TELEPRESENCE

(71) Applicant: AUTODESK, INC., San Rafael, CA (US)

(72) Inventors: Fraser Anderson, Camrose (CA); Bala Thoravi Kumaravel, San Rafael, CA (US); Tovi Grossman, Toronto (CA); George Fitzmaurice, Toronto (CA); Bjoern Hartmann, San Rafael, CA (US)

(73) Assignee: AUTODESK, INC., San Francisco, CA (US)

( * ) Notice: Subject to any disclaimer, the term of this patent is extended or adjusted under 35 U.S.C. 154(b) by 0 days.

(21) Appl. No.: 16/903,303

(22) Filed: Jun. 16, 2020

(65) Prior Publication Data
US 2021/0072947 A1 Mar. 11, 2021

Related U.S. Application Data (60) Provisional application No. 62/897,945, filed on Sep. 9, 2019.

(51) Int. Cl.
*G06F 3/14* (2006.01)
*G06F 3/01* (2006.01)

(52) U.S. Cl.
CPC ............ *G06F 3/1454* (2013.01); *G06F 3/011* (2013.01)

(58) Field of Classification Search
CPC .......... G06F 3/1454; G06F 3/011; G06F 3/14; G06F 3/01; G06F 3/04815; G06F 3/0346; G06T 19/006; G06T 7/70; G06T 19/20; G06T 19/00; G06T 7/292; G06T 2207/10028; G06T 17/00; H04N 13/275; H04N 13/122
See application file for complete search history.

(56) References Cited

U.S. PATENT DOCUMENTS

2009/0231425 A1* 9/2009 Zalewski ............. H04N 13/204
348/142
2013/0201276 A1* 8/2013 Pradeep ................. H04N 7/157
348/14.03

(Continued)

OTHER PUBLICATIONS

Augmented Reality, PTC.com, Retrieved Jan. 24, 2021 from https://www.ptc.com/en/technologies/augmented-reality, 8 pages.

(Continued)

*Primary Examiner* — Xilin Guo
(74) *Attorney, Agent, or Firm* — Artegis Law Group, LLP (57) ABSTRACT

A technique for remote mixed-reality interaction between users includes determining a first position of a first object within a first three-dimensional (3D) space; generating first information associated with the first 3D space for the first object based on the first position; transmitting the first information to a computing device that renders first video content for display within a second 3D space based on the first information; and while transmitting the first information to the computing device, receiving second information that is associated with the second 3D space and with a second object and generated based on a second position determined for the second object within the second 3D space.

20 Claims, 5 Drawing Sheets

(56) References Cited

U.S. PATENT DOCUMENTS

| | | | | |
|---|---|---|---|---|
| 2015/0350654 | A1* | 12/2015 | Chung | H04N 19/172 |
| | | | | 375/240.06 |
| 2019/0303594 | A1* | 10/2019 | Shimakawa | H04L 65/4023 |
| 2020/0154076 | A1* | 5/2020 | Russell | H04N 7/142 |

OTHER PUBLICATIONS

Intelligent Manufacturing, Microsoft.com, Manufacturing and Industrial IoT, Retrieved Jan. 24, 2021 from https://www.microsoft.com/en-us/industry/manufacturing, 6 pages.

Fologram, Fologram.com, Retrieved Jan. 24, 2021 from https://fologram.com, 10 pages.

Kinect for Windows, Microsoft.com, Retrieved Jan. 24, 2021 from https://developer.microsoft.com/en-us/windows/kinect, 4 pages.

VIVE VR System, Vive.com, Snapshot dated Mar. 23, 2020, Retrieved Jan. 24, 2021 from https://web.archive.org/web/20200323171202/https://www.vive.com/us/product/vive-virtual-reality-system/, 6 pages.

ZED Mini, Stereolabs.com, ZED Mini—Mixed-Reality Camera, Retrieved Jan. 24, 2021 from https://www.stereolabs.com/zed-mini, 12 pages.

Anderson et al., "YouMove: Enhancing Movement Training with an Augmented Reality Mirror", In Proceedings of the 26th Annual ACM Symposium on User Interface Software and Technology (UIST '13), https://doi.org/10.1145/2501988.2502045, Oct. 8-11, 2013, pp. 311-320.

Baudisch et al., "Focus Plus Context Screens: Combining Display Technology with Visualization Techniques", In Proceedings of the 14th Annual ACM Symposium on User Interface Software and Technology (UIST '01), https://doi.org/10.1145/502348.502354, Nov. 11-14, 2001, pp. 31-40.

Bauer et al., "A Collaborative Wearable System with Remote Sensing", In Digest of Papers, Second International Symposium on Wearable Computers (Cat. No. 98EX215), https://doi.org/10.1109/ISWC.1998.729524, 1998, pp. 10-17.

Botden et al., "What is going on in augmented reality simulation in laparoscopic surgery?", Surgical Endoscopy, vol. 23, No. 8, DOI 10.1007/s00464-008-0144-1, 2009, pp. 1693-1700.

Botden et al., "ProMIS Augmented Reality Training of Laparoscopic Procedures Face Validity", Simulation in healthcare: journal of the Society for Simulation in Healthcare, vol. 3, No. 2, https://doi.org/10.1097/SIH.0b013e3181659e91, 2008, pp. 97-102.

Budrionis et al., "An Evaluation Framework for Defining the Contributions of Telestration in Surgical Telementoring", Interactive Journal of Medical Research, vol. 2, No. 2, http://www.i-jmr.org/2013/2/e14/, 2013, pp. 1-9.

Collins et al., "Cognitive Apprenticeship: Teaching the Craft of Reading, Writing and Mathematics", Technical Report 403, Illinois Univ., Center for the Study of Reading and Bolt, Retrieved Jan. 22, 2021 from https://eric.ed.gov/?id=ED284181, 1987, pp. 1-37.

Dayrit et al., "Free-Viewpoint AR Human-Motion Reenactment Based On a Single RGB-D Video Stream", In Multimedia and Expo (ICME), IEEE International Conference, 2014, pp. 1-6.

Fuchs et al., "Immersive 3D Telepresence", IEEE Computer, vol. 47, No. 7, DOI: 10.1109/MC.2014.185, Jul. 2014, pp. 46-52.

Fussell et al., "Effects of Head-Mounted and Scene-Oriented Video Systems on Remote Collaboration on Physical Tasks", In Proceedings of the SIGCHI Conference on Human Factors in Computing Systems (CHI '03), vol. 5, No. 1, https://doi.org/10.1145/642611.642701, Apr. 5-10, 2003, pp. 513-520.

Grantcharov et al., "Randomized clinical trial of virtual reality simulation for laparoscopic skills training", British Journal of Surgery, vol. 91, No. 2, 2004, pp. 146-150.

Henderson et al., "Augmented Reality for Maintenance and Repair (ARMAR)", DTIC Document, Retrieved Jan. 22, 2021 from https://apps.dtic.mil/sti/citations/ADA475548, 2007, 70 pages.

Henderson et al., "Augmented Reality in the Psychomotor Phase of a Procedural Task", In Proceedings of the 2011 10th IEEE International Symposium on Mixed and Augmented Reality (ISMAR '11), https://doi.org/10.1109/ISMAR.2011.6092386, Oct. 26-29, 2011, pp. 191-200.

Hough et al., "Timing and Grounding in Motor Skill Coaching Interaction: Consequences for the Information State", Proceedings of the 19th SemDial Workshop on the Semantics and Pragmatics of Dialogue (goDIAL), 2015, 9 pages.

Ishii, Hiroshi, "TeamWorkStation: Towards a Seamless Shared Workspace", In Proceedings of the 1990 ACM Conference on Computer-supported Cooperative Work (CSCW '90), https://doi.org/10.1145/99332.99337, Oct. 1990, pp. 13-26.

Ishii et al., "ClearBoard: A Seamless Medium for Shared Drawing and Conversation with Eye Contact", In Proceedings of the SIGCHI Conference on Human Factors in Computing Systems (CHI '92), https://doi.org/10.1145/142750.142977, May 3-7, 1992, pp. 525-532.

Ishii et al., "Interactive Design of Seamless Collaboration Media", Retrieved Apr. 4, 2019 from http://link.galegroup.com/apps/doc/A15936127/AONE?sid=googlescholar, Communications of the ACM, vol. 37, No. 8, Aug. 1994, pp. 83-97.

Izadi et al., "KinectFusion: Real-time Dynamic 3D Surface Reconstruction and Interaction", In ACM SIGGRAPH 2011 Talks (SIGGRAPH '11), Article 23, https://doi.org/10.1145/2037826.2037857, Aug. 7-11, 2011, pp. 23:1-23:1.

Jones et al., "RoomAlive: Magical Experiences Enabled by Scalable, Adaptive Projector-camera Units", In Proceedings of the 27th Annual ACM Symposium on User Interface Software and Technology (UIST '14), https://doi.org/10.1145/2642918.2647383, Oct. 5-8, 2014, pp. 637-644.

Kasahara et al., "JackIn: Integrating First-Person View with Out-of-Body Vision Generation for Human-Human Augmentation", In Proceedings of the 5th Augmented Human International Conference on—AH '14, https://doi.org/10.1145/2582051.2582097, Mar. 7-9, 2014, pp. 1-8.

Kazi et al., "Kitty: Sketching Dynamic and Interactive Illustrations", In Proceedings of the 27th annual ACM symposium an User interface software and technology, http://dx.doi.org/10.1145/2642918.2647375, Oct. 5-8, 2014, pp. 395-405.

Kazi et al., "Draco: Bringing Life to Illustrations with Kinetic Textures", In Proceedings of the 32Nd Annual ACM Conference on Human Factors in Computing Systems (CHI '14), https://doi.org/10.1145/2556288.2556987, Apr. 26-May 1, 2014, pp. 351-360.

De Kok et al., "A Multimodal System for Real-Time Action Instruction in Motor Skill Learning", In Proceedings of the 2015 ACM on International Conference on Multimodal Interaction (ICMI '15), https://doi.org/10.1145/2818346.2820746 Nov. 9-13, 2015, pp. 355-362.

Kolb, David A., "Introduction," in "Experiential Learning: Experience as the Source of Learning and Development", 2nd Edition, Pearson Education, 2015, pp. xvi-xxv.

Kolkmeier et al., "With a Little Help from a Holographic Friend:The OpenIMPRESS Mixed Reality Telepresence Toolkit for Remote Collaboration Systems", In Proceedings of the 24th ACM Symposium on Virtual Reality Software and Technology—VRST '18, https://doi.org/10.1145/3281505.3281542, Nov. 28-Dec. 1, 2018, pp. 1-11.

Lindlbauer et al., "Remixed Reality: Manipulating Space and Time in Augmented Reality", In Proceedings of the 2018 CHI Conference on Human Factors in Computing Systems (CHI '18), https://doi.org/10.1145/3173574.3173703, Apr. 21-26, 2018, pp. 129:1-129:13.

Miles et al., "A review of virtual environments for training in ball sports", Computers & Graphics, vol. 36, No. 6, http://dx.doi.org/10.1016/j.cag.2012.04.007, 2012, pp. 714 726.

Nakae et al., "Support System to Review Manufacturing Workshop Through Multiple Videos", In Proceedings of the 23rd International Conference on Intelligent User Interfaces Companion (IUI '18 Companion), https://doi.org/10.1145/3180308.3180312, Mar. 7-11, 2018, pp. 4:1-4:2.

Nawahdah et al., "Motion Adaptive Orientation Adjustment of a Virtual Teacher to Support Physical Task Learning", Information and Media Technologies, vol. 7, No. 1, https://doi.org/10.11185/imt.7.506, 2012, pp. 506-515.

(56) References Cited

OTHER PUBLICATIONS

Orts-Escolano et al., "Holoportation: Virtual 3D Teleportation in Real-time", In Proceedings of the 29th Annual Symposium on User Interface Software and Technology (UIST '16), https://doi.org/10.1145/2984511.2984517, Oct. 16-19, 2016, pp. 741-754.

Palmer et al., "Annotating with Light for Remote Guidance", In Proceedings of the 19th Australasian Conference on Computer-Human Interaction: Entertaining User Interfaces (OZCHI '07), https://doi.org/10.1145/1324892.1324911, Nov. 28-30, 2007, pp. 103-110.

Perlin et al., "Chalktalk : A Visualization and Communication Language—As a Tool in the Domain of Computer Science Education", arXiv:1809.07166 [cs], Retrieved Jul. 8, 2019 from http://arxiv.org/abs/1809.07166, Nov. 2018, 6 pages.

Piumsomboon et al., "Mini-Me: An Adaptive Avatar for Mixed Reality Remote Collaboration", In Proceedings of the 2018 CHI Conference on Human Factors in Computing Systems—CHI '18, https://doi.org/10.1145/3173574.3173620, Apr. 21-26, 2018, pp. 1-13.

Rajgopal et al., "How Tech Companies Can Help Upskill the U.S. Workforce", Harvard Business Review, Retrieved Jan. 24, 2021 from https://hbr.org/2018/02/how-tech-companies-can-help-upskill-the-u-s-workforce, Feb. 20, 2018, 5 pages.

Ranjan et al., "Dynamic Shared Visual Spaces: Experimenting with Automatic Camera Control in a Remote Repair Task", In Proceedings of the SIGCHI Conference on Human Factors in Computing Systems (CHI '07), https://doi.org/10.1145/1240624.1240802, Apr. 28-May 3, 2007, pp. 1177-1186.

Reznick, Richard K., "Teaching and Testing Technical Skills", The American Journal of Surgery, vol. 165, No. 3, https://doi.org/10.1016/S0002-9610(05)80843-8, Mar. 1993, pp. 358-361.

Sadideen et al., "Practical skills teaching in contemporary surgical education: how can educational theory be applied to promote effective learning?", The American Journal of Surgery, vol. 204, No. 3, https://doi.org/10.1016/j.amjsurg.2011.12.020, 2012, pp. 396-401.

Saraiji et al., "Development of Mutual Telexistence System Using Virtual Projection of Operator's Egocentric Body Images", In Proceedings of the 25th International Conference on Artificial Reality and Telexistence and 20th Eurographics Symposium on Virtual Environments (ICAT—EGVE '15), https://doi.org/10.2312/egve.20151319, 2015, pp. 125-132.

Sigrist et al., "Augmented visual, auditory, haptic, and multimodal feedback in motor learning: A review", Psychonomic Bulletin & Review, vol. 20, DOI 10.3758/s13423-012-0333-8, 2013, pp. 21-53.

Sigrist et al., "Visual and Auditory Augmented Concurrent Feedback in a Complex Motor Task", Presence Teleoperators and Virtual Environments, vol. 20, No. 1, https://doi.org/101162/pres_a_00032, Feb. 2011, pp. 15-32.

Sodhi et al., "LightGuide: Projected Visualizations for Hand Movement Guidance", May 5-10, 2012, pp. 179-188.

Speicher et al., "360Anywhere: Mobile Ad-hoc Collaboration in Any Environment using 360 Video and Augmented Reality", Proceedings of the ACM on Human-Computer Interaction, vol. 2, No. EICS, Article 9, https://doi.org/10.1145/3229091, Jun. 2018, pp. 1-20.

Stoakley et al., "Virtual Reality on a WIM: Interactive Worlds in Miniature", In Proceedings of the SIGCHI conference on Human factors in computing systems, Retrieved Apr. 6, 2016 from http://dl.acm.org/citation.cfm?id=223938, May 7-11, 1995, pp. 265-272.

Sun et al., "Employing Different Viewpoints for Remote Guidance in a Collaborative Augmented Environment", In Proceedings of the Sixth International Symposium of Chinese CHI, https://doi.org/10.1145/3202667.3202676, Apr. 21-22, 2018, pp. 64-70.

Szalavari et al., "Studierstube"—An Environment for Collaboration in Augmented Reality, Virtual Reality, vol. 3, No. 1, 1998, pp. 37-48.

Fang et al., "Physio@ Home: Exploring visual guidance and feedback techniques for physiotherapy exercises", In Proceedings of the 33rd Annual ACM Conference on Human Factors in Computing Systems, http://dx.doi.org/10.1145/2702123.2702401, Apr. 18-23, 2015, pp. 4123-4132.

Kumaravel et al., "TutoriVR: A Video-Based Tutorial System for Design Applications in Virtual Reality", In Proceedings of the 2019 CHI Conference on Human Factors in Computing Systems—CHI '19, https://doi.org/10.1145/3290605.3300514, May 4-9, 2019, pp. 1-12.

Tsang et al., "Boom Chameleon: Simultaneous capture of 3D viewpoint, voice and gesture annotations on a spatially-aware display", In Proceedings of the 15th annual ACM symposium on User interface software and technology (UIST '02), vol. 4, No. 2, https://doi.org/10.1145/571985.572001, Oct. 27-30, 2002, pp. 111-120.

Velloso et al., "MotionMA: Motion Modelling and Analysis by Demonstration", Proceedings of CHI 2013, Apr. 27-May 2, 2013, pp. 1309-1318.

Wulf et al., "Motor skill learning and performance: a review of influential factors", Medical Education, vol. 44, No. 1, https://doi.org/10.1111/j.1365-2923.2009.03421.x, 2010, pp. 75-84.

* cited by examiner

REMOTE INTERACTION VIA BI-DIRECTIONAL MIXED-REALITY TELEPRESENCE

CROSS-REFERENCE TO RELATED APPLICATION

This application claims the benefit of U.S. Provisional Application titled, "TECHNIQUES FOR REMOTE INSTRUCTION OF PHYSICAL TASKS USING BI-DIRECTIONAL MIXED-REALITY TELEPRESENCE," filed Sep. 9, 2019, having Ser. No. 62/897,945. The subject matter of this related application is hereby incorporated herein by reference.

BACKGROUND OF THE INVENTION

Field of the Invention

Embodiments of the present invention relate generally to computer science and, more specifically, to remote interaction via bi-directional mixed-reality telepresence.

Description of the Related Art

Learning an activity that requires physical skill, such as playing a musical instrument, employing a manufacturing tool, constructing a house, creating an object of art, etc., is greatly facilitated by personal instruction. In many disciplines, an in-person coaching experience is invaluable, since real-time observation by a teacher enables immediate feedback to the learner. In that regard, theories of skill acquisition suggest that any system targeted at teaching physical tasks should be dynamic and fulfill several requirements, including, and without limitation, allowing the learner to observe the teacher employing the physical skill (for modeling), allowing the teacher to observe the learner performing the physical skill (for coaching), allowing the teacher to provide live feedback during performance of a task that employs the physical skill, allowing the teacher to provide post-mortem feedback after performance of the task has ended, and enabling abstraction and conceptualization of the physical skill for both the teacher and learner.

One problem oftentimes experienced with in-person coaching, though, is that finding a suitable teacher for a specific skill can be time-consuming and difficult. The prospective learner must seek out and find a teacher who has the appropriate skill set, happens to be located nearby, and is available to perform the desired instruction. Given these difficulties, recent efforts have focused on providing different types of remote instruction to learners.

In one example, teaching physical skills via instructional videos have become increasingly popular. Currently, numerous instructional videos for almost any subject of interest are available either online or commercially. One drawback of instructional videos, however, is that videos are limited to a unidirectional instruction mode, in which information flows in a single direction from the teacher to the learner. That is, teacher feedback is not generally available in response to a specific performance or question on the part of the learner, and information is presented by the teacher with no context of what the learner has the ability to do or has done. In addition, the spatial nature of a particular physical task or skill being learned is oftentimes lost or altered when learning is attempted solely by video. As a result of these deficiencies, the efficacy of learning a physical skill by video falls far below that of having an-person coach or teacher.

In another example, significant research has been directed to the use of computer-based interfaces for remotely guiding and instructing users in physical tasks, such as augmented reality (AR), virtual reality (VR), and other modalities. In conventional AR-based and VR-based instruction approaches, the learner can be visually immersed in a three-dimensional environment and, consequently, can have a more realistic exposure to the spatial nature of performing a given physical task. Thus, AR-based and VR-based instruction can provide a richer experience for the learner relative to video-based instruction. Nevertheless, conventional AR-based and VR-based instruction approaches still suffer from limited interactivity between the teacher and the learner. For example, a learner usually receives only unidirectional instruction in a virtual environment, because instructor feedback is generally not received during or after the learner performs a targeted skill in the virtual environment. Further, any instructor feedback that happens to be received by the learner with respect to the performance of a targeted skill is generally asynchronous in nature, in that the feedback is received from an instructor after the performance is completed. In addition, conventional AR-based and VR-based instruction approaches typically rely on a single modality of capture and presentation data streams, such as two-dimensional video or virtual content, to teach or guide the remote learner. Thus, with more virtualized approaches, the spatial nature of physical tasks and/or instructor feedback related to those tasks is oftentimes lost due to the constraints of the presentation medium and the inability to interact with an instructor in a bi-directional manner.

As the foregoing illustrates, what is needed in the art are more effective techniques for remote interactions between learners and instructors.

SUMMARY

One embodiment of the present invention sets forth a technique for remote mixed-reality interaction between users, the method comprising determining a first position of a first object within a first three-dimensional (3D) space; generating first information associated with the first 3D space for the first object based on the first position; transmitting the first information to a computing device that renders first video content for display within a second 3D space based on the first information; and while transmitting the first information to the computing device, receiving second information that is associated with the second 3D space and with a second object and generated based on a second position determined for the second object within the second 3D space.

At least one technical advantage of the disclosed techniques relative to the prior art is that the disclosed techniques enable a bi-directional interface that provides a mixed-reality presence for both an instructor residing in a teaching space or location and a learner residing in a learning space or location that is different than the teaching space or location. Accordingly, the disclosed techniques allow the instructor and the learner to operate in either an AR mode or a VR mode when interacting in a shared three-dimensional virtual space. In addition, a synchronous avatar indicating the current position of one user, either the instructor or the learner, within the space or location in which that user resides can be displayed to the other user. Understanding the current position of the other user allows the instructor and the learner to interact with each other in real-time in the shared three-dimensional virtual space. These technical advantages represent one or more technological improvements over prior art approaches.

BRIEF DESCRIPTIONS OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

System Overview

Figure 1:
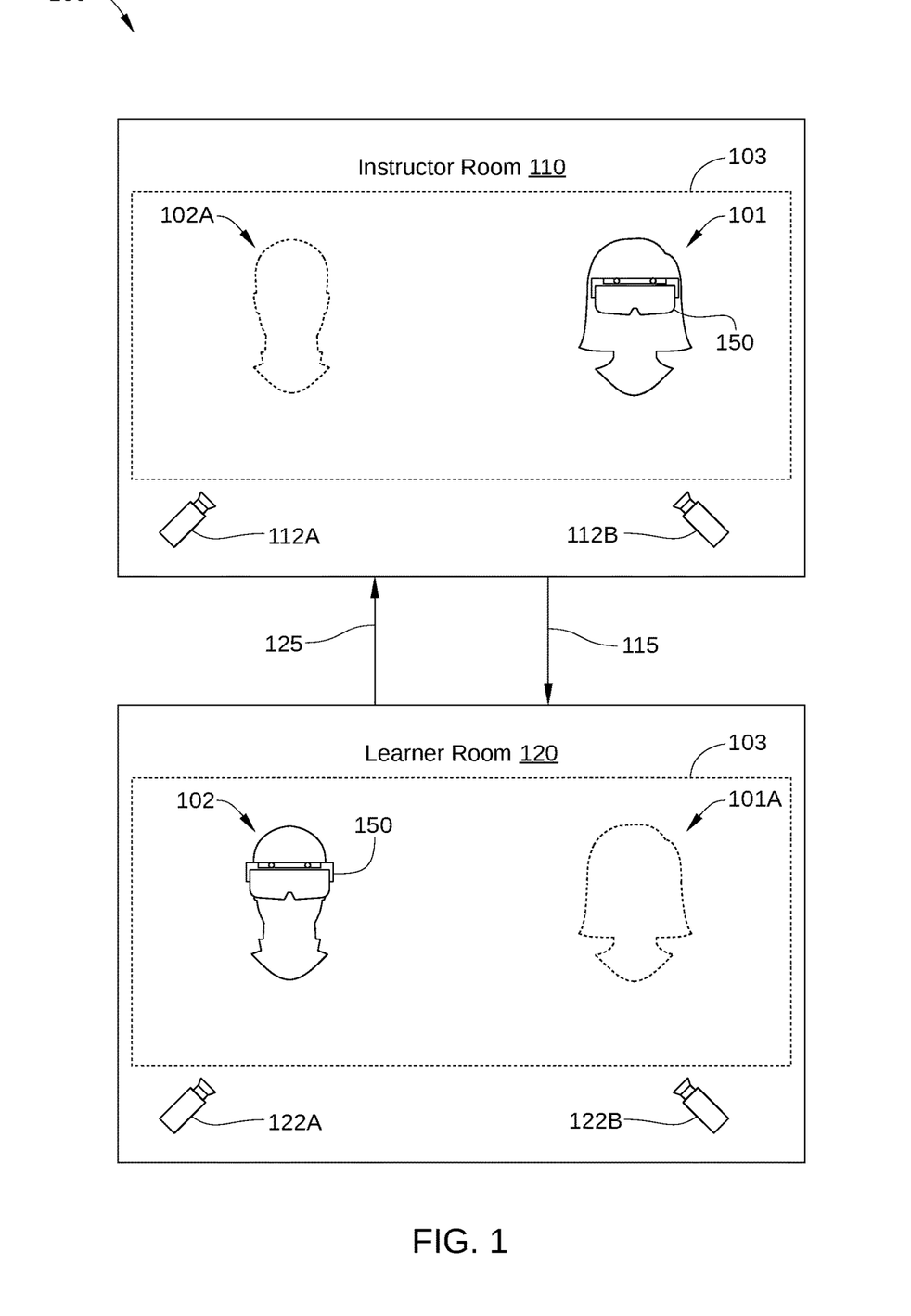
FIG. 1 illustrates a mixed reality (MR) telepresence system configured to implement one or more aspects of the various embodiments.

FIG. 1 illustrates a mixed reality (MR) telepresence system 100 configured to implement one or more aspects of the embodiments. MR telepresence system 100 is configured to enable remote guidance and instruction of a user (hereinafter referred to as a "learner") in physical tasks via bi-directional MR telepresence. MR telepresence system 100 includes an instructor room 110, with an instructor 101 disposed therein, and a learner room 120, with a learner 102 disposed therein. Instructor 101 is a subject matter expert who is engaged in the remote guidance and/or instruction of learner 102 in a physical skill, such as playing an instrument, learning to sculpture, assembling or constructing a machine or structure, performing surgery, and the like. By contrast, learner 102 is a person who is engaged in remote learning of the physical skill.

Instructor room 110 and learner room 120 are located remotely from each other, and each can generally be placed anywhere that has an adequate network connection suitable for the transmission and receipt of three-dimensional (3D) space information 115 and 125. 3D space information 115 includes 3D point-cloud information for instructor room 110 and/or 3D position and/or orientation information for certain position-tracked objects within instructor room 110. The 3D point-cloud information included in 3D space information 115 can indicate a shape and position of a surface (or surfaces) detected in instructor room 110. In some embodiments, 3D space information 115 further includes 2D video content capturing one or more specific views of instructor room 110. Similarly, 3D space information 125 includes 3D point-cloud information for learner room 120 and/or 3D position and/or orientation information for certain position-tracked objects within learner room 120. The 3D point-cloud information included in 3D space information 125 can indicate a shape and position of a surface (or surfaces) detected in learner room 120. In some embodiments, 3D space information 125 further includes 2D video content capturing one or more specific views of learner room 120. The transmission and receipt of 3D space information 115 and 125 enables the creation and use of a shared 3D virtual space 103 that can be synchronously experienced by both instructor 101 and learner 102. In some embodiments, shared 3D virtual space 103 includes all of instructor room 110 and learner room 120. In other embodiments, shared 3D virtual space 103 includes a specified portion of instructor room 110 and learner room 120, such as a 10'×15'×8' volume.

As shown, MR telepresence system 100 includes one or more 3D spatial data capture systems 112A and 112B disposed in instructor room 110 and one or more 3D spatial data capture systems 122A and 122B in learner room 120. 3D spatial data capture systems 112A and 112B are configured to generate 3D location and other space information for objects visible within the shared 3D virtual space 103 of instructor room 110, and include such 3D information in 3D space information 115. 3D spatial data capture systems 122A and 122B are configured to generate 3D and other space information for objects visible within the shared 3D virtual space 103 of learner room 120, and include such 3D information in 3D space information 125.

As described in greater detail below, transmission of 3D space information 115 to learner room 120 enables learner 102 to see a synchronous avatar 101A of instructor 101. Synchronous avatar 101A can include one or more tracked body parts of instructor 101, such as the head and/or hands. Consequently, when learner 102 is viewing shared 3D virtual space 103 in AR mode with head-mounted AR/VR display 150, synchronous avatar 101A is visible to learner 102 and can indicate to learner 102 where instructor 101 is located in shared 3D virtual space 103 and where instructor 101 is looking and/or pointing in real-time. Thus, learner 102 can participate in a bi-directional interaction with instructor 101. Similarly, transmission of 3D space information 125 to learner room 110 enables instructor 101 to see a synchronous avatar 102A of learner 102. Synchronous avatar 102A can include one or more tracked body parts of learner 102. As a result, when instructor 101 is viewing shared 3D virtual space 103 in AR mode with head-mounted AR/VR display 150, synchronous avatar 102A is visible to instructor 101 and can indicate to instructor 101 where learner 102 is located in shared 3D virtual space 103 and where learner 102 is looking and/or pointing in real-time. Thus, instructor 101 can participate in a bi-directional interaction with learner 102.

During a remote-teaching session of a targeted physical task or skill, instructor 101 and learner 102 each wear a head-mounted AR/VR display 150. Alternatively, instructor 101 and learner 102 can each interact with a different configuration of AR/VR display, such as a projection AR/VR system and/or a hand-held video see-through AR/VR projection system.

When head-mounted AR/VR display 150 is in AR mode, graphics are overlaid on a video stream of the physical world from the current point of view of the user wearing the head-mounted AR/VR display 150. Thus, the user's view of the physical world is augmented with additional graphics. Examples of such graphics include virtual annotations made in the 3D shared virtual space 103 by instructor 101 or learner 102, a control menu or other user interface, synchronous avatar 101A or 102A (which corresponds to the location of the remote user in 3D shared virtual space 103), and the like. When head-mounted AR/VR display 150 is in VR mode, the user's view of the physical world is occluded with digital graphics that are rendered to provide a virtual view of some other three-dimensional space, such as a view of 3D shared virtual space 103 from a different point of view than from the current position of the user experiencing VR.

Thus, when instructor 101 and learner 102 each wear a head-mounted AR/VR display 150 within 3D shared virtual space 103, MR telepresence system 100 includes two symmetric spaces, where each space supports a single user (either instructor 101 or learner 102) and contains an immersive mixed-reality display. Further, the physical environment of instructor 101 or learner 102 can be spatially captured and streamed in real-time to the other remote user. In some embodiments, two-dimensional (2D) video is also presented to a user alongside the AR content. The 2D video can present asynchronous content, such as a video recording of a previous performance of learner 102 or a previous demonstration by instructor 101. Alternately or additionally, the 2D video can present synchronous content, such as a real-time view of 3D shared virtual space 103 from a different point of view than that of the user. As described below, in some embodiments, pass-through AR is utilized to enable transitions between VR and AR for instructor 101 and learner 102. Thus, instructor 101 and learner 102 can navigate between the local and remote environments (i.e., instructor room 110 and learner room 120) in real-time. Further, instructor 101 and learner 102 can interact with both synchronous and asynchronous recorded data. Such flexibility in the application of various modes of interactivity allows for novel workflows, richer collaboration between instructor 101 and learner 102, and improved training opportunities.

Figure 2:
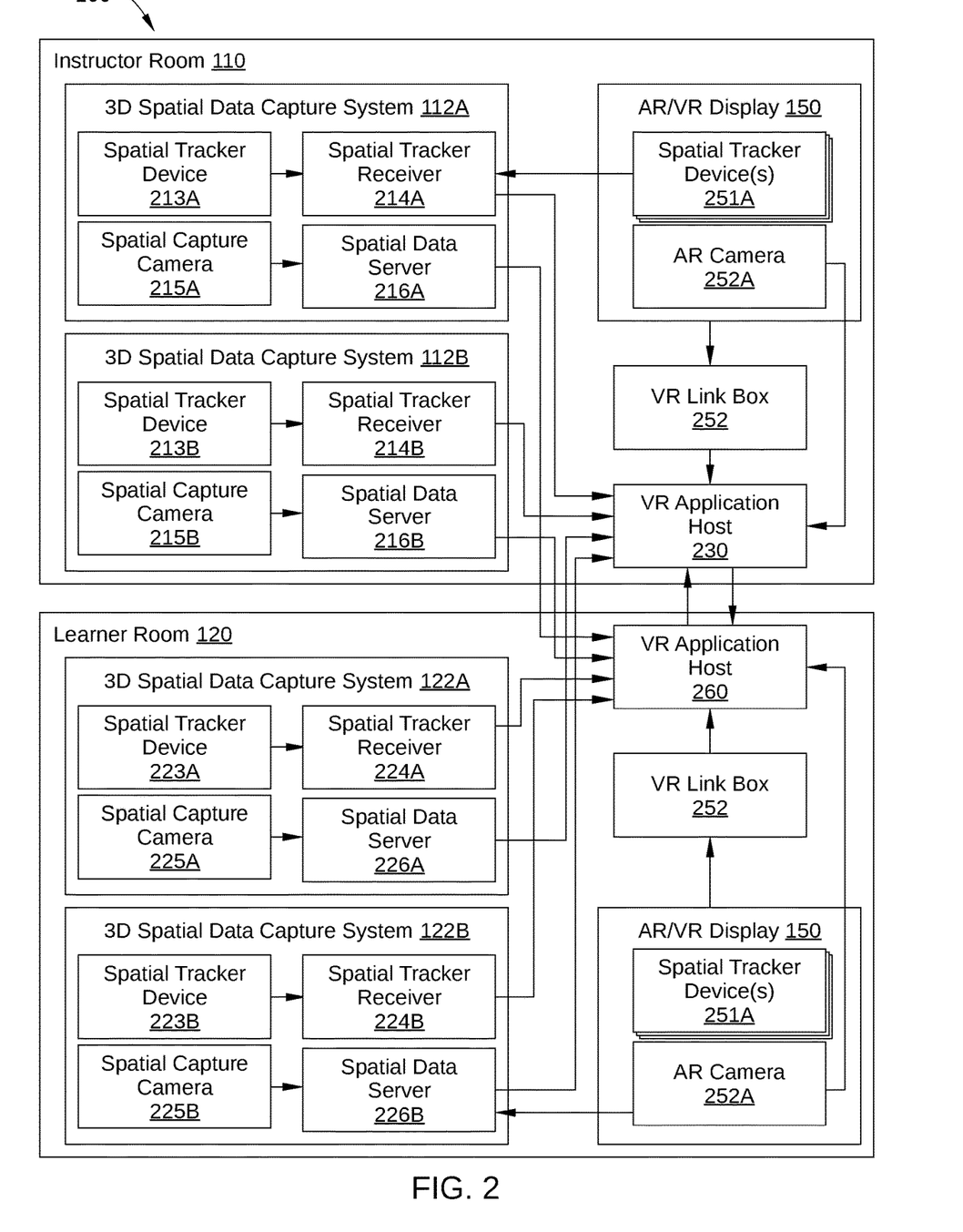
FIG. 2 is a functional block diagram of the MR telepresence system of FIG. 1, according to various embodiments.

FIG. 2 is a functional block diagram of MR telepresence system 100, according to various embodiments. MR telepresence system 100 includes two symmetric infrastructures, one associated with instructor room 110 and one associated with learner room 120. Thus, in the embodiment illustrated in FIG. 2, the portion of MR telepresence system 100 associated with instructor room 110 includes 3D spatial data capture system 112A, 3D spatial data capture system 112B, a head-mounted AR/VR display 150, a VR link box 252, and a VR application host 230. The portion of MR telepresence system 100 associated with learner room 120 includes 3D spatial data capture system 122A, 3D spatial data capture system 122B, another head-mounted AR/VR display 150, another VR link box 252, and a VR application host 260.

VR application host 230 generates AR and VR content for display by the head-mounted AR/VR display 150 disposed in instructor room 110, where the AR and VR content is based on 3D location information received from learner room 120. Specifically, VR application host 230 generates AR and VR content using point-cloud information that describes the position of objects in learner room 120 and is generated by 3D spatial data capture system 122A and 3D spatial data capture system 122B associated with learner room 120.

In some embodiments, VR application host 230 further generates AR and VR content based on position information for a position-tracked object in learner room 120. For example, in some embodiments, the position-tracked object can be a body part of learner 102 that is coupled to a spatial tracker device 251A associated with the head-mounted AR/VR display 150 disposed in learner room 120. In such embodiments, the body part can be the head (tracked by a spatial tracker device 251A coupled to the head-mounted AR/VR display 150 worn by learner 102), hand (tracked by a spatial tracker device 251A coupled to the hand of learner 102 or included in a controller held by learner 102), or the torso (tracked by a spatial tracker device 251A coupled to the body of learner 102). Alternatively or additionally, in some embodiments, the position-tracked object can be an object held by learner 102, such as a pointer, a tool, an instrument, and the like.

Similar to VR application host 239, VR application host 260 generates AR and VR content for display by the head-mounted AR/VR display 150 disposed in learner room 120, where the AR and VR content is based on 3D location information received from instructor room 110. Thus, VR application host 260 generates AR and VR content using point-cloud information that describes the position of objects in instructor room 110 and is generated by 3D spatial data capture system 112A and 3D spatial data capture system 112B. In some embodiments, VR application host 260 further generates AR and VR content based on position information for a position-tracked object in instructor room 110, such as a body part of instructor 101 and/or an object held by instructor 101.

The position information for a position-tracked object in learner room 120 or in instructor room 110 can be determined by any suitable position-tracking sensor system. For example, in some embodiments, the position information for the position-tracked object is determined via a light detection and ranging (LIDAR) system. Alternatively or additionally, in some embodiments, the position information for the position-tracked object is determined using one or more stereo cameras. Alternatively or additionally, in some embodiments, the position information for the position-tracked object is determined using one or more IR sensors.

In some embodiments, VR application host 230 and VR application host 260 each include a plugin or other application that serializes, sends and receives, and deserializes 3D location data and synchronizing metadata transferred between VR application host 230 and VR application host 260. In some embodiments, the synchronizing metadata includes the positions of position-tracked objects (such as instructor 101 hand and head positions and learner 102 hand and head positions), the current AR/VR mode and controller states, the tracked positions of spatial capture cameras, and other lightweight metadata for synchronizing the location of objects in shared 3D virtual space 103. In some embodiments, the synchronizing metadata temporally synchronizes the user experience between VR application host 230 and VR application host 260 at approximately 66 Hz.

3D spatial data capture system 112A includes a spatial tracker device 213A, which wirelessly communicates with a spatial tracker receiver 214A, and a spatial capture camera 215A, such as a Kinect 3D scanner, that is communicatively coupled to a spatial data server 216A. Spatial tracker device 213A is mounted on or otherwise physically associated with the location of spatial capture camera 215A, and enables the real-time determination of the location of spatial capture camera 215A in 3D space. As a result, the coordinate system of the spatial capture camera 215A can be synchronized using known methods with the coordinate system employed by the head-mounted AR/VR display 150 disposed in learner room 120. Spatial tracker receiver 214A receives 3D space information from spatial tracker device 213A and/or spatial tracker devices 251A, or otherwise determines the current location of spatial tracker device 213A and/or spatial tracker devices 251A. For example, in an embodiment, spatial tracker receiver 214A receives position location signals (e.g., wirelessly) from each spatial tracker device 213A and/or spatial tracker devices 251A, where such signals include position information for the spatial tracker device 213A or spatial tracker device 251A transmitting the signal. In such embodiments, the position location signals can be based on inertial information generated by an inertial measurement unit (IMU) included in the spatial tracker device 213A or spatial tracker device 251A transmitting the signal. Alternatively or additionally, in such embodiments, the position location signals can be based on measurements of light pulses received by a photodiode-based sensor included in the spatial tracker device 213A or spatial tracker device 251A transmitting the signal. Alternatively, in some embodiments, spatial tracker receiver 214A determines 3D space information for a spatial tracker device 213A and/or spatial tracker devices 251A by directly measuring the position of spatial tracker device 213A and/or spatial tracker devices 251A. For example, in one such embodiment, spatial tracker receiver 214A directly measures the position of spatial tracker device 213A and/or spatial tracker devices 251A with an IR sensor, a stereo camera, and the like.

Spatial tracker receiver 214A is further configured to communicate the 3D space information of spatial tracker device 213A to VR application host 230, so that a VR application running on VR application host 230 knows the location from which point-cloud information received from spatial data server 216A is generated. Spatial capture camera 215A generates the point-cloud information for instructor room 110 and transmits the point-cloud information for instructor room 110 to VR application host 260, which generates AR and VR content for learner room 120. Spatial data server 216A can be any suitable computing device capable of running dynamic projection mapping software.

3D spatial data capture system 112B is substantially similar in operation and configuration to 3D spatial data capture system 112A. Therefore, 3D spatial data capture system 112B includes a spatial tracker device 213B, which wirelessly communicates with a spatial tracker receiver 214B, and a spatial capture camera 2156 that is communicatively coupled to a spatial data server 216B. Spatial tracker device 2136 is mounted on or otherwise physically associated with the location of spatial capture camera 215B, and enables the real-time determination of the location of spatial capture camera 215B in 3D space. Spatial tracker receiver 214B receives 3D space information from spatial tracker device 213B and communicates the 3D space information to VR application host 230, so that a VR application running on VR application host 230 knows the location from which point-cloud information received from spatial data server 216B is generated. Spatial capture camera 215B generates the point-cloud information for instructor room 110 and transmits the point-cloud information for instructor room 110 to VR application host 260, which generates AR and VR content for learner room 120. Spatial data server 216B can be any suitable computing device capable of running dynamic projection mapping software.

The head-mounted AR/VR display 150 of instructor room 110 is configured to display AR and VR content when worn by instructor 101, including synchronous avatar 102A, a virtual display of learning room 120 from any selected location, etc. As shown, a spatial tracker device 251A is coupled to head-mounted AR/VR display 150, such as a VIVE™ tracker, and enables the determination of the real-time location of spatial capture camera 215A in 3D space. In some embodiments, additional spatial tracker devices 251A may be associated with the wearer of the head-mounted AR/VR display 150 of instructor room 110. For example, one of spatial tracker devices 251A may be coupled to a body part (hand or wrist) of instructor 101, held by instructor 101, or coupled to an object held by instructor 101, such as a pointer, a tool, a paintbrush, a guitar pick, and the like. In addition, the head-mounted AR/VR display 150 of instructor room 110 includes an AR camera 252A, which is positioned on head-mounted AR/VR display 150 to capture real-time 3D video content from the current actual point of view of instructor 102. Thus, when the head-mounted AR/VR display 150 of instructor room 110 is in AR mode, the real-time 3D video captured by AR camera 252A is displayed to the instructor 101, along with any AR content selected by instructor 101.

VR link box 252 is configured as an interface between the head-mounted AR/VR display 150 of instructor room 110 and VR application host 230.

The components of MR telepresence system 100 associated with learner room 120 are substantially similar in configuration and operation to the corresponding components associated with instructor room 110. Thus, 3D spatial data capture systems 122A and 122B are substantially similar in operation and configuration to 3D spatial data capture systems 112A and 1126, the head-mounted AR/VR display 150 disposed in learner room 120 is substantially similar in operation and configuration to the head-mounted AR/VR display 150 disposed in instructor room 110, and VR application host 260 is similar in operation to VR application host 230.

The head-mounted AR/VR displays 150, employed in conjunction with other elements of MR telepresence system 100, are configured to easily switch between an AR mode, in which certain graphics are overlaid on a video of the current point of view of the wearer, and a VR mode, in which 3D content is displayed to the wearer that corresponds to a different point of view than the current actual point of view of the wearer. In some embodiments, additional graphics are also available to a wearer of head-mounted AR/VR display 150, such as a control menu or other user interface, the synchronous avatar of the remote user, and the like. One such embodiment is described below in conjunction with FIG. 3.

MR Telepresence Modes

Figure 3:
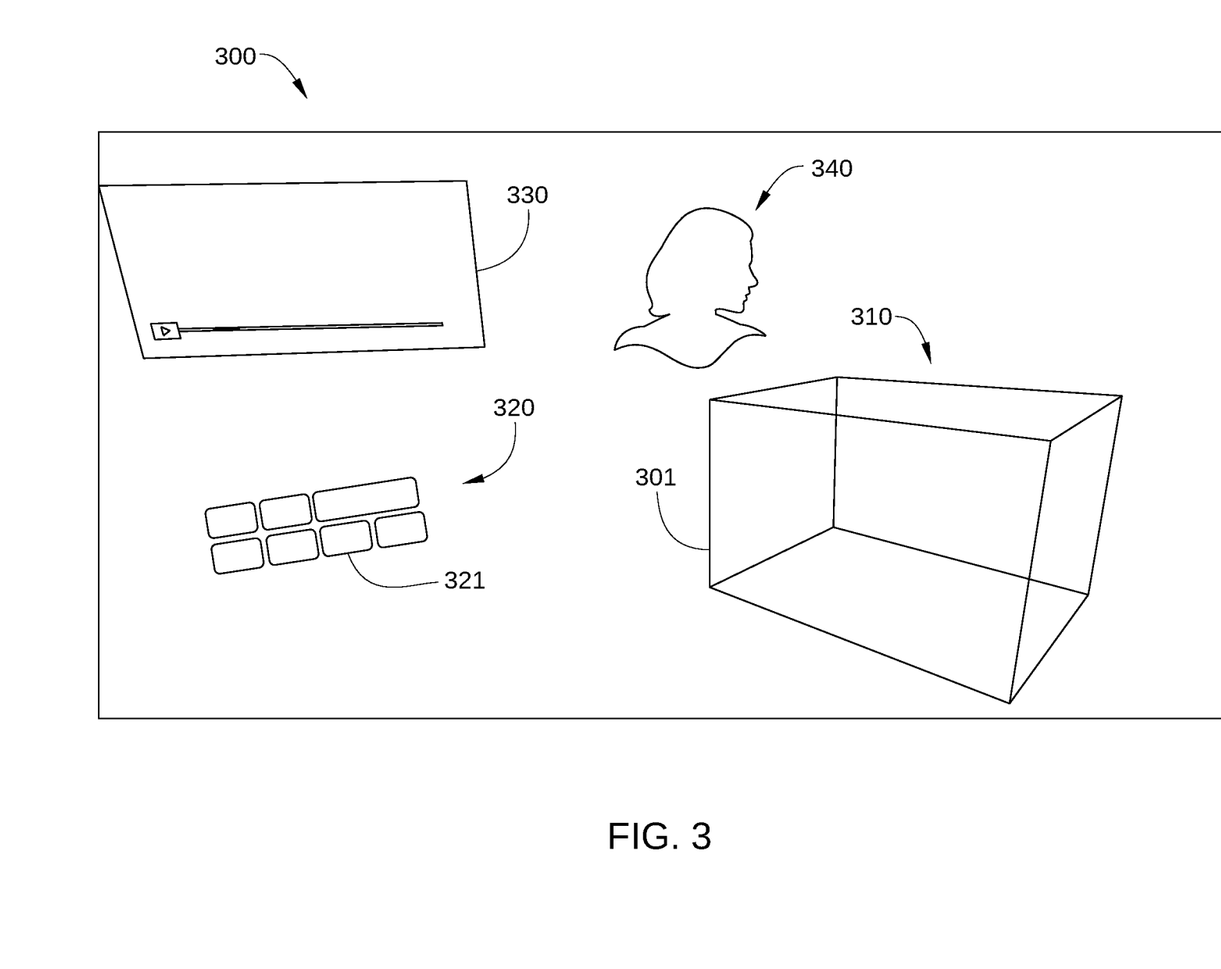
FIG. 3 is an exemplary illustration of an AR view displayed by the head-mounted AR/VR display of FIG. 1, according to various embodiments.

FIG. 3 schematically illustrates an AR view 300 displayed by head-mounted AR/VR display 150, according to various embodiments. AR view 300 is displayed to a user wearing head-mounted AR/VR display 150 when the user has selected AR mode, for example with an input via a mechanical controller device (such as a button or trigger of a VR controller) or via a user interface displayed by AR/VR display 150. In the latter case, a menu option or displayed button corresponding to AR mode may be selected by the user via the VR controller or by any other suitable selection process. In response, AR/VR display 150 displays one or more of the following: a 3D widget 310 that displays a 3D view of shared 3D virtual space 103, a user interface 320 that includes a plurality of control buttons and/or menus 321, and/or a 2D video display 330 that is configured to display a 2D video.

In some embodiments, the positions of 3D widget 310, user interface 320, and/or 2D video display 330 are fixed within the field of view of the user wearing head-mounted AR/VR display 150 and viewing AR view 300. Alternatively, in some embodiments, certain menu selections and/or inputs via a mechanical controller device enable the wearer to reposition, remove, and instantiate 3D widget 310, user interface 320, and/or 2D video display 330.

3D widget 310 renders spatial data that corresponds to shared 3D virtual space 103 and some or all objects located within shared 3D virtual space 103. Thus, 3D widget 310 renders a view constructed from the point cloud of shared 3D virtual space 103 or of the remote location, and enables the viewer of 3D widget 310 to view shared 3D virtual space 103 from any selected angle. In some embodiments, some or all objects located within the portion of the remote room that is coincident with shared 3D virtual space 103 are shown by 3D widget 310. Thus, in such embodiments, the viewer of AR view 300 can observe work being performed by the remote user in shared 3D virtual space 103. In some embodiments, the orientation of 3D widget 310 can be manipulated by the viewer of AR view 300, for example rotated, scaled, zoomed, and/or positioned within AR view 300. In the embodiment illustrated in FIG. 3, 3D widget 310 is defined by a wireframe, color-coded bounding box 301. In embodiments in which multiple 3D spatial data capture systems generate the point cloud displayed by 3D widget 310, data from all such systems is typically calibrated and consolidated within a single 3D widget 310.

User interface 320 enables a viewer of AR view 300 to interact with head-mounted AR/VR display 150 and thereby control the various modes and features available within MR telepresence system 100. For example, selection of certain control buttons and/or menus 321 can enable changing elements of AR view 300, including instantiating or removing 2D video display 330, generating annotations in shared 3D virtual space 103, selecting view point shortcuts, enabling recording and playback of video of instructor room 101 and/or learner room 102, and the like. User interface 320 also enables instructor 101 and learner 102 to easily switch between AR mode and VR mode, substantially strengthening the bi-directional interface between learner 102 and instructor 101. It is noted that switching to VR mode is equivalent to resizing the entire field of view of head-mounted AR/VR display 150 to coincide with the 3D content included in 3D widget 310.

2D video display 330 is configured to display 2D color video streams captured by spatial capture camera 215A, 215B, 225A, and/or 225B, or by any other camera included in MR telepresence system 100. In some embodiments, a viewer of AR view 300 can switch between the available video streams by ray casting at the video with the controller and performing an input (for example, by pulling a trigger of a mechanical VR controller). 2D video display 330 includes a scrubbing thumb to allow the viewer of AR view 300 to navigate back and forth through time while viewing recorded data.

Also included in AR view 300 is a synchronous avatar 340 of the remote user. In the embodiment illustrated in FIG. 3, the real-time location and orientation of a position-tracked object associated with the remote user is represented by synchronous avatar 340, such as the head and/or hands of the remote user. The real-time tracking is provided by the spatial tracker receivers of the 3D spatial data capture system associated with the remote user. The presence of synchronous avatar 340 in AR view 300 facilitates collaboration between instructor 101 and learner 102, allowing the local user to have a strong sense of what the remote user is seeing, looking at, and/or gesturing at. In some embodiments, the local user can determine finer hand movements and gestures of the remote user by the combination of 2D video display 330 and the rendering of synchronous avatar 340.

MR telepresence system 100 enables multiple modes of bi-directional interaction between instructor 101 and learner 102, including an observation mode, an instructor guidance mode, a work along mode, and a collaborative review mode, among others. Each interaction mode can be beneficial to the learning process, depending on the scenario. Thus, each interaction mode can, in certain circumstances, enable more effective learning workflows.

In observation mode, instructor 101 models the desired behavior for learner 102, which is generally most useful during the cognitive phase of learning. In observation mode, instructor 101 employs head-mounted AR/VR display 150 in AR mode, while learner 102 employs head-mounted AR/VR display 150 in VR mode. In some embodiments of observation mode, instructor 101 can see synchronous avatar 102A of learner 102, learner 102 can see 2D video display 330 and 3D widget 310 of instructor room 120, and instructor 101 and learner 102 can both see annotations made in shared 3D virtual space 103. Thus, learner 102 can focus on 3D widget 310 and 2D video display 330. Instructor 101 can perform the task or physical skill being taught, and can annotate points of interest. Learner 102 can navigate between videos and around shared 3D virtual space 103 (i.e., within the volume displayed by 3D widget 310) to obtain novel viewpoints. In addition, learner 102 can annotate the environment of instructor 101, for example, in conjunction with questions being asked. Further, because synchronous avatar 340 of learner 102 informs instructor 101 of the viewpoint of learner 102, instructor 101 can ensure that learner 102 is focusing on the right elements of the physical skill being taught. In embodiments in which spatial capture cameras 215A and/or 215B are not fixed in position, instructor 101 can determine the current viewpoint of learner 102 based on synchronous avatar 340, and relocate one of spatial capture cameras 215A or 215B to a location that provides learner 102 a clear video feed of the work being performed.

In instructor guidance mode, instructor 101 can support coaching and scaffolding, while the learner has a concrete experience with the skill or task being learned. Instructor guidance mode is generally most useful in the cognitive and associative phases of learning. Instructor guidance mode is similar to observation mode, except that the roles of instructor 101 and learner 102 are reversed; learner 102 employs head-mounted AR/VR display 150 in AR mode and instructor 101 employs head-mounted AR/VR display 150 VR mode. In some embodiments of instructor guidance mode, instructor 101 can see 2D video display 330 and 3D widget 310 of learner room 110, learner 102 can see synchronous avatar 101A of instructor 101, and instructor 101 and learner 102 can both see annotations made in shared 3D virtual space 103. Within instructor guidance mode, instructor 101 can scaffold learner 102 as certain tasks are performed by learner 101 in learner room 120. Instructor 101 can provide proactive cues, guidance, or and/or other real-time feedback regarding the performance of learner 102 using annotations and/or voice and gestures.

In work along mode, active experimentation by learner 102 and occasional feedback through coaching by instructor 101 are supported. Thus, work along mode is generally most beneficial during the associative and automatic phases of learning. In work along mode, both instructor 101 and learner 102 employ head-mounted AR/VR display 150 in AR mode, with 3D widget 310 and 2D video display 330 positioned for reduced or minimal interference with the task being taught. Depending on the spatial layout of instructor room 110 and learner room 120 and the type of information required, 3D widget 310 may be a small world-in-miniature disposed near the workspace of instructor 101 or learner 102. Alternatively, 3D widget 310 may be implemented as a full 1:1 scale rendering, which allows for constant, low-touch collaboration while performing independent work. In some embodiments of work along mode, instructor 101 can see 2D video display 330 and 3D widget 310 of learner room 120 and synchronous avatar 102A of learner 102, learner 102 can see 2D video display 330 and 3D widget 310 of instructor room 110 and synchronous avatar 101A of instructor 101, and instructor 101 and learner 102 can both see annotations made in shared 3D virtual space 103. Instructor 101 can occasionally check on the progress of learner 102 and interrupt when necessary to provide guidance. Similarly, learner 102 can interrupt instructor 101 if a question comes up or assistance is needed.

In collaborative review mode, reflection and abstract conceptualization is supported, and is beneficial to the learner throughout most or all stages of learning. In collaborative review mode, both instructor 101 and learner 102 employ head-mounted AR/VR display 150 in VR mode, and typically are viewing a common recording in 3D widget 310 and/or 2D video display 330, which can be of instructor 101 or learner 102. In addition to the common recording in 3D widget 310 and/or 2D video display 330, instructor 101 and learner 102 can both see annotations made in the shared 3D virtual space 103 (i.e., within 3D widget 310), as well as the synchronous avatar 340 of the other user. In collaborative review mode, instructor and learner can both see the other's synchronous avatar 340, speak with each other, and collaboratively annotate the 3D widget 310. Further, instructor 101 can annotate areas of interest, such as errors made by learner 102, key areas of performance, and the like, while learner 102 can indicate questions or where more information is needed.

As described herein, AR and VR spatial capture technology is employed in MR telepresence system 100 to record, augment, and facilitate the remote-teaching of physical skills via a bi-directional telepresence interface. Beneficially, the interface enables an interaction space that can be varied in at least four useful dimensions: perceived space, time, the display configuration, and data modality.

The perceived space dimension refers to which space(s), environments, and people a particular user can currently see and interact with. Thus, in MR telepresence system 100, instructor 101 and learner 102 can each potentially see and interact with the local space and the objects within that space. For example, the user would primarily interact in this space to execute a task or action their own objects or tools. Alternatively, a user may see the other participant's remote space, which includes the environment and objects of the other user. Thus, the user can observe, inspect, and comment on the remote user's actions, body movements, and interactions with tools or objects. Alternatively, a user may see and interact with both the local space as and remote space. With this configuration, a user can see and interact with the remote user as the remote user performs a task within the remote own environment. A user may also choose to see no environment, and only render the audio and avatar of the remote user. This configuration can provide a modality facilitating focused conversation about the task, free from environmental distractions.

The display configuration dimension refers to how a user can see and interact with the space, which in MR telepresence system 100 includes AR and VR. AR facilitates observation and interaction with the local space, gives the user a direct view of the local space environment, and the ability to interact with the environment naturally. AR further provides the ability to augment and annotate the local space. In addition, AR, as employed in MR telepresence system 100, enables the user to situate the remote user in the local space, and interact with the remote user as if the remote user were in the local space. However, when viewing the remote space or reviewing recorded data, having an AR view of the current space may be distracting to the user. For these circumstances, MR telepresence system 100 enables the user to enter VR, where only the recorded data is rendered, allowing the user to eliminate distractions of the local environment and focus on the data of interest for modelling and reflection.

The data modality dimension refers to the type of data collected by MR telepresence system 100 and used to convey information to a user. Using spatial data capture, the user can see and interact with the local or remote space using a 3D reconstruction of that environment. This spatial information allows the user to obtain 3D information not readily available through other forms of data presentation, such as 2D video. Thus, MR telepresence system 100 enables the user to navigate to novel viewpoints to avoid issues with occlusion, and further enables annotations in 3D space. Additionally, a user can see a 2D video of either the local or remote space. A 2D video can provide a high resolution, easily understood mechanism to comprehend the environment and activities. In the local space, the video can provide novel viewpoints to enable third-person views of the user's own actions and environment.

Remote Interaction Via Bi-Directional Mixed-Reality Telepresence

Figure 4:
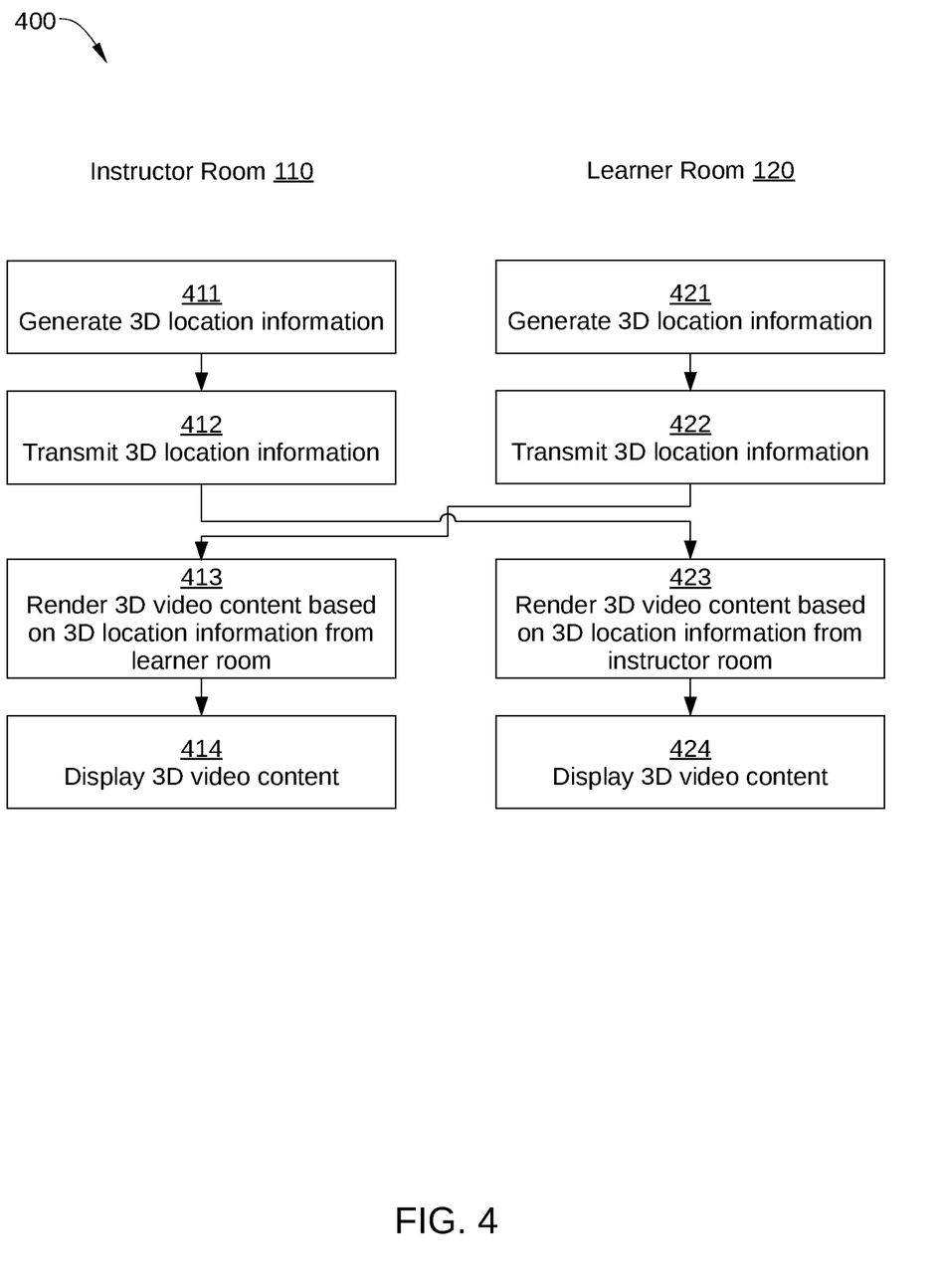
FIG. 4 sets forth a flowchart of method steps for remote mixed reality interaction between users, according to various embodiments.

FIG. 4 sets forth a flowchart of method steps for remote interaction via mixed-reality telepresence, according to various embodiments. Although the method steps are described in conjunction with the systems of FIGS. 1-3, persons skilled in the art will understand that any system configured to perform the method steps, in any order, is within the scope of the embodiments.

As shown, a method 400 begins at step 411, where 3D space information associated with one or more objects in instructor room 110 is generated. For example, in some embodiments, the 3D space information includes point cloud information for instructor room 110, and is generated by a spatial data server associated with instructor room 110. For example, the spatial data server generating such point cloud information can include spatial data server 216A and/or spatial data server 216B.

Alternatively or additionally, in some embodiments, the 3D space information includes 3D position information for a position-tracked object disposed in instructor room 110. For example, the position-tracked object can include a body part of a user disposed who is disposed in instructor room 110. In such embodiments, the body part is coupled to or holding a spacial tracker device, such as spacial tracker device 213A or 213B. Further, in such embodiments, the 3D space data is generated by a VR application running on a computing device associated with instructor room 110, such as VR application host 230.

In step 421, 3D space information associated with one or more objects in learner room 120 is generated. The 3D space information is similar to that generated in step 411, except that the one or more objects are disposed in learner room 120. Thus, in some embodiments, the 3D space information includes point cloud information for learner room 110 and is generated by a spatial data server associated with learner room 110; in some embodiments, the 3D space information includes 3D position information for a position-tracked object in learner room 120; and in some embodiments, the 3D space information includes a combination of both.

In some embodiments, steps 411 and 421 are performed substantially concurrently. That is, in some embodiments, at least a portion of step 411 is performed at instructor room 110 while at least a portion of step 421 is performed at learner room 120. Alternatively, in some embodiments, steps 411 and 421 are completed at points in time that are sufficiently close (e.g., less than about 1 second apart), that latency to instructor 101 and learner 102 is not noticeable.

In step 412, the 3D space data generated in step 411 is transmitted to a VR application associated with learner room 120, such as VR application host 260. In step 422, the 3D space data generated in step 421 is transmitted to a VR application associated with instructor room 110, such as VR application host 230. As with step 411 and 421, in some embodiments, steps 412 and 422 are performed substantially concurrently.

In step 413, 3D video content is rendered based on the 3D space data generated in step 421 and received from a computing device associated with learner room 120. For example, when the 3D space data includes point cloud information for learner room 120, the 3D video content includes content for display by a head-mounted AR/VR display 150 disposed in instructor room 110 via 3D widget 310. When the 3D space data includes 3D position information for a position-tracked object disposed in learner room 120, the 3D video content includes a synchronous avatar 340 of the object disposed in learner room 120, where the synchronous avatar 340 is for display by a head-mounted AR/VR display 150 disposed in instructor room 110 via 3D widget 310. In some embodiments, in step 413, the 3D video content is generated by a computing device associated with instructor room 110, such as VR application host 230. Generally, the computing device associated with instructor room 110 ensures that the 3D video content is correctly synchronized temporally and spatially with shared 3D virtual space 103 as perceived by instructor 101 and learner 102.

In step 423, 3D video content is rendered based on the 3D space data generated in step 411 and received from a computing device associated with instructor room 110. For example, when the 3D space data includes point cloud information for instructor room 110, the 3D video content includes content for display by a head-mounted AR/VR display 150 disposed in learner room 120 via 3D widget 310. When the 3D space data includes 3D position information for a position-tracked object disposed in learner room 120, the 3D video content includes a synchronous avatar 340 of the object disposed in instructor room 110, where the synchronous avatar 340 is for display by a head-mounted AR/VR display 150 disposed in learner room 120 via 3D widget 310. In some embodiments, in step 423, the 3D video content is generated by a computing device associated with learner room 120, such as VR application host 260. Generally, the computing device associated with learner room 120 ensures that the 3D video content is correctly synchronized temporally and spatially with shared 3D virtual space 103 as perceived by instructor 101 and learner 102.

As with step 411 and 421, in some embodiments, steps 413 and 423 are performed substantially concurrently.

In step 414, the 3D video content generated in step 413 is displayed by the head-mounted AR/VR display 150 disposed in instructor room 110. When the head-mounted AR/VR display 150 is in AR mode, the 3D video content is generally displayed via 3D widget 310, and when the head-mounted AR/VR display 150 is in VR mode, the 3D video content is generally displayed as VR content.

In step 424, the 3D video content generated in step 423 is displayed by the head-mounted AR/VR display 150 disposed in learner room 120. As noted above, when the head-mounted AR/VR display 150 is in AR mode, the 3D video content is generally displayed via 3D widget 310, and when the head-mounted AR/VR display 150 is in VR mode, the 3D video content is generally displayed as VR content.

Rendering large point clouds in AR can demand significant computing resources. According to some embodiments, sampling rates of AR content, such as point-cloud sampling and 2D video sampling, are dynamically modified depending on certain criteria. For example, in some instances a user is more likely to be focused on a rendering of the point cloud of shared 3D virtual space 103 rather than on a 2D video feed of either the remote location or the user's own location, such as when the user is viewing shared 3D virtual space 103 in AR. In such an instance, a sampling rate of the location information for the point cloud is increased. Consequently, the user experience can remain high quality and responsive, while still giving the user sufficient context about the remote environment. Conversely, in some instances a user is more likely to be focused on content that is based on a video feed rather than on the point cloud of shared 3D virtual space 103. In such an instance, a sampling rate of the video feed is increased and the sampling rate for location information for the point cloud is decreased, thereby conserving computing resources for sampling and processing video content. One such embodiment is described below in conjunction with FIG. 5.

Figure 5:
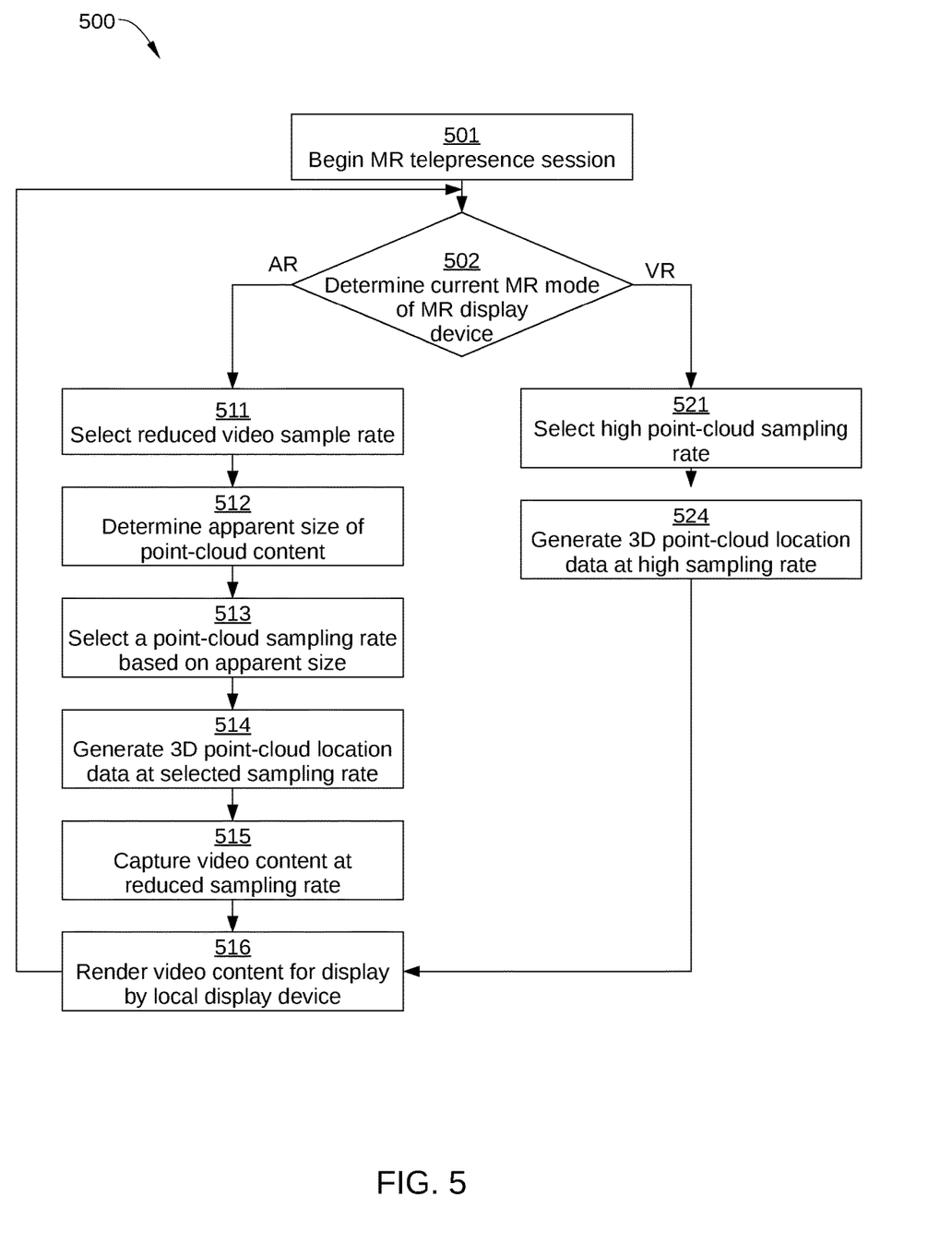
FIG. 5 sets forth a flowchart of method steps for sampling content for mixed-reality (MR) telepresence, according to various embodiments.

FIG. 5 sets forth a flowchart of method steps for sampling content for mixed-reality (MR) telepresence, according to various embodiments. Although the method steps are described in conjunction with the systems of FIGS. 1-4, persons skilled in the art will understand that any system configured to perform the method steps, in any order, is within the scope of the embodiments.

As shown, a method 500 begins at step 501, where a MR telepresence session begins and VR application host 230 and VR application host 260 are communicatively coupled.

In step 502, VR application host 230 determines a current MR mode of an MR display device disposed in the local 3D space, such as a head-mounted AR/VR display 150 disposed in instructor room 120. In some embodiments, VR application host 230 queries the head-mounted AR/VR display 150 for such information. In other embodiments, the head-mounted AR/VR display 150 sends a notification of the current MR status of the head-mounted AR/VR display 150 to VR application host 230 when such status changes. When the current MR mode of the MR display device is AR mode, method 500 proceeds to step 511; if the current MR mode of the MR display device is VR mode, method 500 proceeds to step 521.

In step 511, VR application host 230 selects a reduced video sampling rate for the capture of video by head-mounted AR/VR display 150 (via AR camera 252A). For example, in some embodiments, the video sampling rate is reduced from 30 frames per second (fps) to 10 fps when VR application host 230 determines that head-mounted AR/VR display 150 is in AR mode. Typically, a user is more focused on point-cloud content when in AR, such as that displayed in 3D widget 310, and visual information related to the surrounding environment is more for context. Thus, the reduced video sampling rate does not significantly affect the quality of the user experience when the user is in AR mode.

In step 512, VR application host 230 determines an apparent size of point-cloud content, such as 3D widget 310, to the user in the local space.

In step 513, VR application host 230 selects a point-cloud sampling rate based on the apparent size of point-cloud content to the user in the local space. Specifically, when the point-cloud content is displayed to be smaller in apparent size to the user wearing the head-mounted AR/VR display 150, VR application host 230 selects a lower sampling rate of point-cloud space information in the local space, since the user is less likely to be focusing on the point-cloud content when displayed in this way. By contrast, when the point-cloud content is displayed to be larger in apparent size to the user, VR application host 230 selects a higher sampling rate of point-cloud space information in the local space, since a user is likely to be focusing on the point-cloud content when displayed prominently in AR mode.

In step 514, VR application host 230 causes 3D point-cloud space data for the local space to be generated at the selected point-cloud sampling rate. For example, in some embodiments, sufficient 3D point-cloud space data for the local space is generated for a complete point-cloud of the local space to be captured.

In step 515, VR application host 230 causes video content to be captured by AR camera 252A. For example, in some embodiments video content is captured of the local space using two (stereo) cameras, so that a complete video frame for each eye can be subsequently rendered of the local space or a portion of the local space.

In step 516, VR application host 230 renders video content for display by the head-mounted AR/VR display 150 in the local space. In step 516, the video content so rendered is based on the 3D point-cloud space data generated in step 514. In addition, in instances where the head-mounted AR/VR display 150 in the local space is in AR mode, the video content so rendered is further based on the video content captured by AR camera 252A in step 515. Method 500 then returns to step 502.

Step 521 is performed in response to VR application host 230 determining that the current mode of the head-mounted AR/VR display 150 is in VR mode. In step 521, VR application host 230 selects a high point-cloud sampling rate. In some embodiments, the video feed from AR camera 252A is generally disabled when the head-mounted AR/VR display 150 is in VR mode. In such embodiments, 3D video content displayed by the head-mounted AR/VR display 150 is based on point-cloud space data.

In step 524, VR application host 230 causes 3D point-cloud space data for the local space to be generated at the selected point-cloud sampling rate. For example, in some embodiments, sufficient 3D point-cloud space data for the local space is generated for a complete point-cloud of the local space to be captured. The method then proceeds to step 516.

In sum, the embodiments provide techniques for remote interaction via a bi-directional mixed-reality interface. The bi-directional interface is implemented via the transmission of first 3D space information measured in a first space to a second computing device that renders the first 3D space information into first 3D video content for display within a second space and the transmission of second 3D space information measured in the second space to a first computing device that renders the second 3D space information into second 3D video content for display within the first space. The 3D space information can include point cloud information for a particular space, 3D position information for certain position-tracked objects in the particular space, or a combination of both.

At least one technical advantage of the disclosed techniques relative to the prior art is that the disclosed techniques enable a bi-directional interface that provides a mixed-reality presence for both an instructor residing in a teaching space or location and a learner residing in a learning space or location that is different than the teaching space or location. Accordingly, the disclosed techniques allow the instructor and the learner to operate in either an AR mode or a VR mode when interacting in a shared three-dimensional virtual space. In addition, a synchronous avatar indicating the current position of one user, either the instructor or the learner, within the space or location in which that user resides can be displayed to the other user. Understanding the current position of the other user allows the instructor and the learner to interact with each other in real-time in the shared three-dimensional virtual space. These technical advantages represent one or more technological improvements over prior art approaches 1. In some embodiments, a computer-implemented method for remote mixed-reality interaction between users includes: determining a first position of a first object within a first three-dimensional (3D) space; generating first information associated with the first 3D space for the first object based on the first position; transmitting the first information to a computing device that renders first video content for display within a second 3D space based on the first information; and while transmitting the first information to the computing device, receiving second information associated with the second 3D space and with a second object and generated based on a second position determined for the second object within the second 3D space.

2. The computer-implemented method of clause 1, further comprising: rendering the second information into second video content; and causing the second video content to be displayed within the first 3D space.

3. The computer-implemented method of clauses 1 or 2, further comprising, prior to causing the second video content to be displayed within the first 3D space, temporally synchronizing the first video content with the second video content.

4. The computer-implemented method of any of clauses 1-3, further comprising, prior to causing the second video content to be displayed within the first 3D space, spatially synchronizing the first video content with the second video content.

5. The computer-implemented method of any of clauses 1-4, wherein the first information includes first 3D point-cloud information for the first 3D space.

6. The computer-implemented method of any of clauses 1-5, further comprising causing the first video content to be displayed within the second 3D space as augmented reality content.

7. The computer-implemented method of any of clauses 1-6, wherein the first object comprises a position-tracked object, and the first information includes 3D location information for the position-tracked object.

8. The computer-implemented method of any of clauses 1-7, wherein determining the first position of the first object comprises receiving signals from a spatial tracker device coupled to the first object.

9. The computer-implemented method of any of clauses 1-8, wherein the first position of the first object within the first 3D space is determined while the second position of the second object within the second 3D space is determined.

10. The computer-implemented method of any of clauses 1-9, wherein the first video content for display within the second 3D space comprises 3D video content.

11. In some embodiments, a system includes: a sensor configured to determine a first position of a first object disposed within a first three-dimensional (3D) space; a memory that stores instructions; and a processor that is coupled to the memory and is configured to perform the steps of, upon executing the instructions: causing the sensor to determine the first position of the first object within the first 3D space; generating first information associated with the first 3D space for the first object based on the first position; transmitting the first information to a computing device that renders first video content for display within a second 3D space based on the first information; and while transmitting the first information to the computing device, receiving second information that is associated with the second 3D space and with a second object and generated based on a second position determined for the second object within the second 3D space.

12. The system of clause 11, wherein the sensor comprises one of an IR depth sensor and a photodiode-based tracker configured to measure the timing of light pulses.

13. The system of clauses 11 or 12, further comprising: a first 3D display device disposed within the first 3D space; and a second 3D display device disposed within the second 3D space, wherein the processor is further configured to perform the steps of, upon executing the instructions: rendering the second information into second video content; and causing the second video content to be displayed by the first 3D display device.

14. The system of any of clauses 11-13, wherein the processor is further configured to cause the second video content to be displayed by the first 3D display device while the first video content is displayed by the second 3D display device.

15. The system of any of clauses 11-14, wherein the first 3D display device comprises a first head-mounted augmented-reality (AR) display device, and the second 3D display device comprises a second head-mounted AR display device.

16. The system of any of clauses 11-15, wherein the processor is further configured to determine the first position of the first object within the first 3D space by: determining a mixed reality mode associated with a second 3D display device disposed within the second 3D space and configured to display the first video content; based on the mixed reality mode, selecting a position measurement sampling rate; and performing one or more position measurements of the first object within the first 3D space at the position measurement sampling rate.

17. The system of any of clauses 11-16, wherein the processor is further configured to, based on the mixed reality mode associated with the second 3D display device: select a 2D video sampling rate; and generate, at the 2D video sampling rate, 2D video of at least a portion of the first 3D space.

18. The system of any of clauses 11-17, wherein the processor is further configured to transmit the 2D video of at least a portion of the first 3D space to the computing device in conjunction with the first information.

19. The system of any of clauses 11-18, wherein the first information includes first 3D point-cloud information associated with a surface detected in the first 3D space.

20. In some embodiments, a non-transitory computer readable medium stores instructions that, when executed by a processor, cause the processor to perform the steps of: determining a first position of a first object within a first three-dimensional (3D) space; generating first information associated with the first 3D space for the first object based on the first position; transmitting the first information to a computing device that renders first video content for display within a second 3D space based on the first information; and while transmitting the first information to the computing device, receiving second information that is associated with the second 3D space and with a second object and generated based on a second position determined for the second object within the second 3D space.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for remote mixed-reality interaction between users, the method comprising:
   determining a first position of a first object within a first three-dimensional (3D) space that is part of a first real-world environment;
   generating first information associated with the first 3D space, the first information including the first position;
   transmitting the first information to a computing device;
   while transmitting the first information to the computing device, receiving, from the computing device, second information associated with a second 3D space that is part of a second real-world environment, the second information including second position determined for a second object within the second 3D space; and
   displaying the first 3D space or the second 3D space, wherein displaying the first 3D space or the second 3D space includes rendering the first object based on the first position of the first object within the first 3D space and rendering the second object based on the second position of the second object within the second 3D space.

2. The computer-implemented method of claim 1, further comprising:
   rendering the second information into second video content; and
   causing the second video content to be displayed within the first 3D space.

3. The computer-implemented method of claim 2, further comprising, prior to causing the second video content to be displayed within the first 3D space, temporally synchronizing the second video content with first video content based on the first information.

4. The computer-implemented method of claim 2, further comprising, prior to causing the second video content to be displayed within the first 3D space, spatially synchronizing the second video content with first video content based on the first information.

5. The computer-implemented method of claim 1, wherein the first information includes first 3D point-cloud information for the first 3D space.

6. The computer-implemented method of claim 5, further comprising causing the first 3D space to be displayed within the second 3D space as augmented reality content.

7. The computer-implemented method of claim 1, wherein the first object comprises a position-tracked object, and the first information includes 3D location information for the position-tracked object.

8. The computer-implemented method of claim 7, wherein determining the first position of the first object comprises receiving signals from a spatial tracker device coupled to the first object.

9. The computer-implemented method of claim 1, wherein the first position of the first object within the first 3D space is determined while the second position of the second object within the second 3D space is determined.

10. The computer-implemented method of claim 1, wherein the first information includes 3D video content.

11. A system, comprising:
    a sensor configured to determine a first position of a first object disposed within a first three-dimensional (3D) space that is part of a first real-world environment;
    a memory that stores instructions; and
    a processor that is coupled to the memory and is configured to perform the steps of, upon executing the instructions:
       causing the sensor to determine the first position of the first object within the first 3D space;
       generating first information associated with the first 3D space, the first information including the first position;
       transmitting the first information to a computing device; and
       while transmitting the first information to the computing device, receiving, from the computing device, second information that is associated with a second 3D space that is part of a second real-world environment, the second information including a second position determined for a second object within the second 3D space; and
       displaying the first 3D space or the second 3D space, wherein displaying the first 3D space or the second 3D space includes rendering the first object based on the first position of the first object within the first 3D space and rendering the second object based on the second position of the second object within the second 3D space.

12. The system of claim 11, wherein the sensor comprises one of an IR depth sensor and a photodiode-based tracker configured to measure a timing of light pulses.

13. The system of claim 11, further comprising:
    a first 3D display device disposed within the first 3D space; and a second 3D display device disposed within the second 3D space, wherein the processor is further configured to perform the steps of, upon executing the instructions:

rendering the second information into second video content; and causing the second video content to be displayed by the first 3D display device.

14. The system of claim 13, wherein the processor is further configured to cause the second video content to be displayed by the first 3D display device while the first 3D space is displayed by the second 3D display device.

15. The system of claim 13, wherein the first 3D display device comprises a first head-mounted augmented-reality (AR) display device, and the second 3D display device comprises a second head-mounted AR display device.

16. The system of claim 11, wherein the processor is further configured to determine the first position of the first object within the first 3D space by:

determining a mixed reality mode associated with a second 3D display device disposed within the second 3D space and configured to display first video content based on the first information;

based on the mixed reality mode, selecting a position measurement sampling rate; and performing one or more position measurements of the first object within the first 3D space at the position measurement sampling rate.

17. The system of claim 16, wherein the processor is further configured to, based on the mixed reality mode associated with the second 3D display device:

select a 2D video sampling rate; and generate, at the 2D video sampling rate, 2D video of at least a portion of the first 3D space.

18. The system of claim 17, wherein the processor is further configured to transmit the 2D video of at least a portion of the first 3D space to the computing device in conjunction with the first information.

19. The system of claim 11, wherein the first information includes first 3D point-cloud information associated with a surface detected in the first 3D space.

20. A non-transitory computer readable medium storing instructions that, when executed by a processor, cause the processor to perform the steps of:

determining a first position of a first object within a first three-dimensional (3D) space that is part of a first real-world environment;

generating first information associated with the first 3D space, the first information including the first position;

transmitting the first information to a computing device;

while transmitting the first information to the computing device, receiving, from the computing device, second information that is associated with a second 3D space that is part of a second real-world environment, the second information including a second position determined for a second object within the second 3D space; and displaying the first 3D space or the second 3D space, wherein displaying the first 3D space or the second 3D space includes rendering the first object based on the first position of the first object within the first 3D space and rendering the second object based on the second position of the second object within the second 3D space.

* * * * *

UNITED STATES PATENT AND TRADEMARK OFFICE
CERTIFICATE OF CORRECTION

PATENT NO.        : 11,442,685 B2
APPLICATION NO.   : 16/903303
DATED             : September 13, 2022
INVENTOR(S)       : Fraser Anderson et al.

It is certified that error appears in the above-identified patent and that said Letters Patent is hereby corrected as shown below:

On the Title Page

Item [56] delete "FANG et al., "Physio@ Home: Exploring visual guidance and feedback techniques for physiotherapy exercises", In Proceedings of the 33rd Annual ACM Conference on Human Factors in Computing Systems, http://dx.doi.org/10.1145/2702123.2702401, April 18-23, 2015, pp. 4123–4132." and insert --Tang et al., "Physio® Home: Exploring visual guidance and feedback techniques for physiotherapy exercises", In Proceedings of the 33rd Annual ACM Conference on Human Factors in Computing Systems, http://dx.doi.org/10.1145/2702123.2702401, April 18-23, 2015, pp. 4123–4132.--;

In the Claims

Column 19, Claim 1, Line 55, insert --a-- after including.

Signed and Sealed this
Twentieth Day of December, 2022

Katherine Kelly Vidal
*Director of the United States Patent and Trademark Office*